United States Patent
Scott

(10) Patent No.: US 8,675,834 B2
(45) Date of Patent: *Mar. 18, 2014

(54) SYSTEM AND APPARATUS FOR MANAGING CALLS

(71) Applicant: AT&T Intellectual Property I, LP, Atlanta, GA (US)

(72) Inventor: Charles V. Scott, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,375

(22) Filed: Apr. 30, 2013

(65) Prior Publication Data

US 2013/0243168 A1  Sep. 19, 2013

Related U.S. Application Data

(63) Continuation of application No. 13/677,408, filed on Nov. 15, 2012, now Pat. No. 8,451,991, which is a continuation of application No. 11/696,538, filed on Apr. 4, 2007, now Pat. No. 8,345,834.

(51) Int. Cl.
*H04M 1/64* (2006.01)
(52) U.S. Cl.
USPC .................................. 379/88.22; 379/88.12

(58) Field of Classification Search
USPC ................................. 379/88.12, 88.22, 88.23
See application file for complete search history.

(56) References Cited

U.S. PATENT DOCUMENTS

| | | | |
|---|---|---|---|
| 5,711,011 A * | 1/1998 | Urs et al. | ....... 455/520 |
| 6,178,338 B1 | 1/2001 | Yamagishi | |
| 6,590,965 B1 | 7/2003 | Poole | |
| 6,771,761 B1 | 8/2004 | LaPierre | |
| 7,551,729 B1 * | 6/2009 | Lin et al. | ..... 379/88.25 |
| 2004/0258233 A1 | 12/2004 | Poustchi et al. | |
| 2005/0195954 A1 | 9/2005 | Klein et al. | |
| 2005/0207361 A1 * | 9/2005 | Rosenberg et al. | ........... 370/282 |
| 2008/0084980 A1 | 4/2008 | Florkey et al. | |

FOREIGN PATENT DOCUMENTS

EP   0586953   3/1994

* cited by examiner

*Primary Examiner* — Amal Zenati
(74) *Attorney, Agent, or Firm* — Guntin & Gust, PLC; Douglas Schnabel

(57) ABSTRACT

A system and apparatus for managing calls to voice mail is disclosed. A system that incorporates teachings of the present disclosure may include, for example, a voicemail system having a controller element that receives a call redirected away from a targeted communication device without providing the targeted communication device notice of the call responsive to a voicemail redirection request supplied by signaling information associated with the call. Additional embodiments are disclosed.

20 Claims, 3 Drawing Sheets

100

116

US 8,675,834 B2

SYSTEM AND APPARATUS FOR MANAGING CALLS

CROSS-REFERENCE TO RELATED APPLICATIONS

This application is a continuation of and claims priority to U.S. patent application Ser. No. 13/677,408 filed Nov. 15, 2012, which is a continuation of U.S. patent application Ser. No. 11/696,538 filed Apr. 4, 2007, now U.S. Pat. No. 8,345,834, which is incorporated herein by reference in its entirety.

FIELD OF THE DISCLOSURE

The present disclosure relates generally to communication systems, and more specifically to a system and apparatus for managing calls.

BACKGROUND

Individuals often desire to communicate with another party without live interaction. Emails have provided such communications but access to email is not always available. Voicemail can provide a non-interactive service when the called party does not answer a call. However, the caller is not ensured that the called party will not answer the call.

A need therefore arises for a system and apparatus for managing calls.

DETAILED DESCRIPTION

Embodiments in accordance with the present disclosure provide a system and apparatus for managing calls.

In a first embodiment of the present disclosure, a computer-readable storage medium can have computer instructions for detecting a call directed to a communication device according to signaling information comprising an identifier (ID) of the communication device and a voicemail redirection request; and redirecting the call to a voicemail system responsive to the voicemail redirection request without transmitting a notice of the call to the communication device.

In a second embodiment of the present disclosure, a voicemail system can have a controller element that receives a call redirected away from a targeted communication device without providing the targeted communication device notice of the call responsive to a voicemail redirection request supplied by signaling information associated with the call.

In a third embodiment of the present disclosure, a communication device, can have a controller element that initiates a call with signaling information including an identifier of a targeted communication device and a voicemail redirection request that requests redirection of the call to a voicemail system without notice supplied to the targeted communication device.

Figure 1:
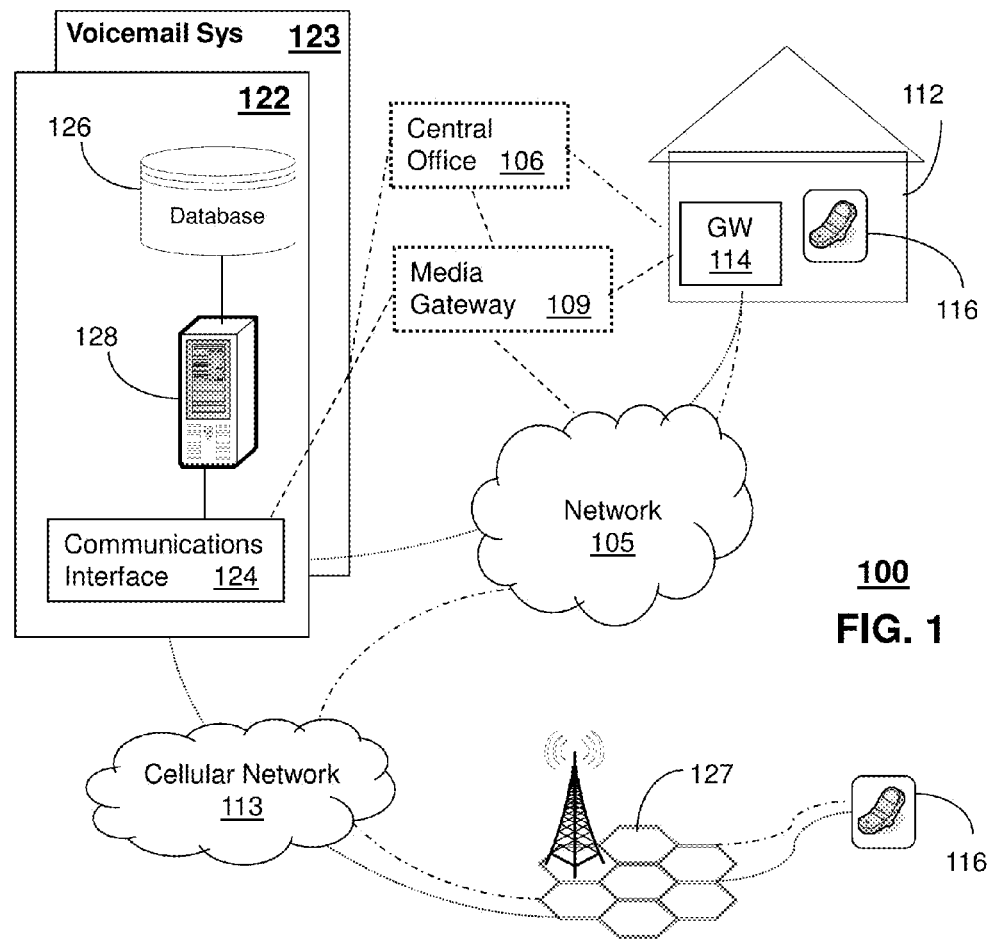
FIG. 1 depicts an exemplary embodiment of a communication system.

FIG. 1 depicts an exemplary embodiment of a communication device 116 communicating by way of wired and wireless access points (WAPs) with other communication devices and/or a network proxy or management system 122 which collectively operate in a communication system 100. The communication device 116 can be a multimode VOIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, the cellular network 113 and network elements located in one or more of the buildings 112 representing an enterprise or residence. The ISP network 105 utilizes technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises) telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Controller 128 of the network proxy 122 can include a message processing system or sub-system which can be utilized to direct calls to a common voicemail system 123 to record by common means callback messages. The message processing system can redirect calls to the voicemail system 123 when it detects a calling party is unable to or does not desire to communicate directly with a called party. The callback message supplied by a calling party to the voicemail system 123 can represent a caller ID retrieved from a call initiated by the calling party over the communication network 100 utilizing common means, and/or a voicemail message supplied thereby.

The voicemail system 123 can include technology such as found in an interactive voice response system (IVR) for interacting with the calling and called parties utilizing voice and keyed input signals (e.g., DTMF tones), and for processing a callback message supplied by the calling party according to a particular call flow design. The voicemail system 123 can support subscribers who are interested in storing callback messages such as a recorded voice message. The message processing system of the network proxy 122 can be provisioned to interact cooperatively with the voicemail system 123 to enhance processing of callback messages. The present disclosure contemplates the voicemail system 123 being a separate control system or systems in communication with the network proxy 122.

Figure 2:
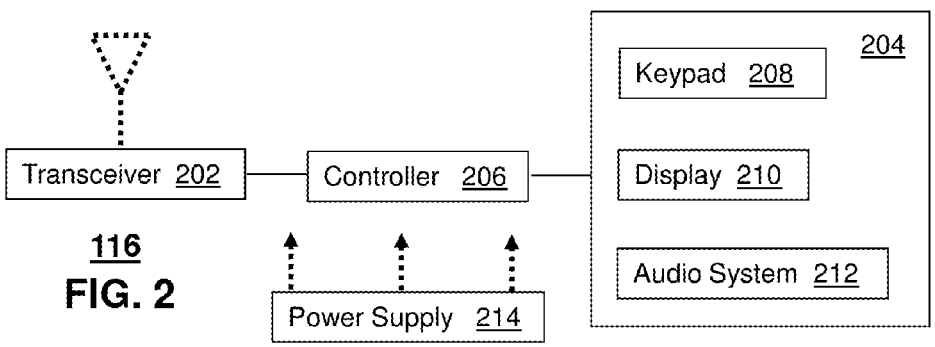
FIG. 2 depicts an exemplary block diagram of one of several embodiments for a communication device operating in the communication system.

FIG. 2 depicts an exemplary embodiment of the communication device 116. The communication device 116 can comprise a wired and/or wireless transceiver 202, a user interface (UI) 204, a power supply 214, and a controller 206 for managing operations thereof. In an embodiment where the communication device 116 operates in a landline environment, the transceiver 202 utilizes common wireline access technology to support POTS or VOIP services.

In a wireless communications setting, the transceiver 202 can utilize common technologies to support singly or in combination any number of wireless access technologies including without limitation cordless phone technology (e.g., DECT), Bluetooth™, Wireless Fidelity (WiFi), Worldwide Interoperability for Microwave Access (WiMAX), Ultra Wide Band (UWB), software defined radio (SDR), and cellular access technologies such as CDMA-1X, W-CDMA/HSDPA, GSM/GPRS, TDMA/EDGE, and EVDO. SDR can be utilized for accessing a public or private communication spectrum according to any number of communication protocols that can be dynamically downloaded over-the-air to the communication device 116. It should be noted also that next generation wireless access technologies can be applied to the present disclosure.

The UI 204 can include a keypad 208 with depressible or touch sensitive navigation disk and keys for manipulating operations of the communication device 116. The UI 204 can further include a display 210 such as monochrome or color LCD (Liquid Crystal Display) for conveying images to the end user of the communication device 116, and an audio system 212 that utilizes common audio technology for conveying and intercepting audible signals of the end user.

The power supply 214 can utilize common power management technologies such as replaceable batteries, supply regulation technologies, and charging system technologies for supplying energy to the components of the communication device 116 and to facilitate portable applications. In stationary applications, the power supply 214 can be modified so as to extract energy from a common wall outlet and thereby supply DC power to the components of the communication device 116. The controller 206 can utilize computing technologies such as a microprocessor and/or digital signal processor (DSP) with associated storage memory such a Flash, ROM, RAM, SRAM, DRAM or other like technologies for controlling operations of the aforementioned components of the communication device 116.

Figure 3:
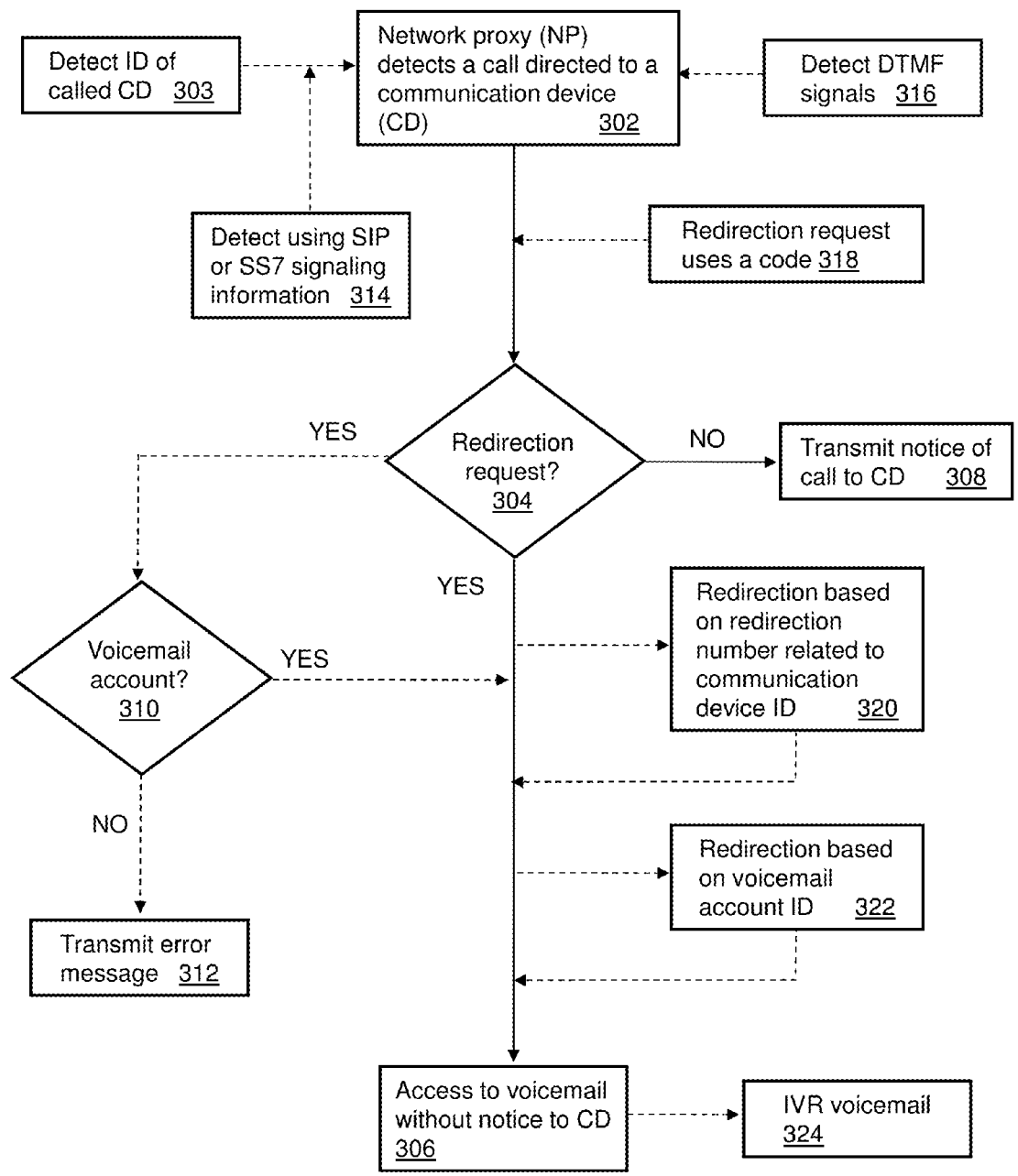
FIG. 3 depicts an exemplary method operating in portions of the communication system.

FIG. 3 depicts an exemplary method 300 operating in portions of the communication system 100. Method 300 has variants as depicted by the dashed lines. It would be apparent to an artisan with ordinary skill in the art that other embodiments not depicted in FIG. 3 are possible without departing from the scope of the claims described below.

Method 300 begins with step 302 where a calling party initiates a call to the communication device 116 of a called party which can be detected by the network proxy 122. The calling party can utilize a communication device similar or different to the called party (e.g., a cell phone, PSTN phone, VoIP phone, etc.) to initiate the call. The call can be detected by the network proxy 122 by analyzing signaling information such as SIP or SS7 associated with the detected call. In one embodiment, signaling information can comprise an ID (e.g., an E.164 number, SIP URI, Tel URI, etc.) of the communication device 116 which can also be detected by the network proxy 122, as in step 303. In step 304, the network proxy 122 can determine whether the call includes a request for redirection to a voicemail system associated with the communication device 116 of the called party. For illustration purposes the voicemail system of the called party is assumed to be the voicemail system 123.

With this in mind, if the call includes a redirection request, then in step 306 the network proxy 122 redirects the call to the voicemail system 123 without transmitting a notice of the call to the communication device 116 of the called party. Hence, the called party does not hear a common alert signal such as a loud ring, melody or other form of alert generated by the communication device 116 of the called party since the called party's communication device does not receive signaling information from the communication system 100 associated with the call initiated by the calling party. A voicemail redirection request therefore provides the calling party a feature to avoid contact with the called party if recording a message by way of the voicemail system 123 is satisfactory to the calling party. If on the other hand the network proxy 122 detects in step 304 that the call does not include the redirection request, then the network proxy proceeds to step 308 where it directs one or more network elements of the communication system 100 to transmit the notice of the call to the communication device 116 by common means.

In one embodiment, the network proxy 122 can be programmed to determine whether a voicemail account exists for the communication device 116 that is being called, as in step 310. The determination of the existence of the voicemail account can be based upon the ID of the communication device 116 or other suitable information associated with said device. If a voicemail account does exist for the communication device 116, then access can be provided by the network proxy 122 to the voicemail system 123 without transmitting a notice of the call to the communication device 116 as previously described in step 306. If the communication device 116 does not have a voicemail account, then notice of the lack of a voicemail account, e.g., an error message, can be provided by the network proxy 122 to the calling party when a redirection request is detected, as in step 312. The particular type of notice transmitted by the network proxy 122 can depend upon the caller's communication device, and can include an auto-connection with an audio message or a text message to indicate the lack of a voicemail account. In one embodiment, the error message can include an option for re-dialing the communication device 116.

As noted earlier, the detection of the call to, and/or the ID of, the communication device 116 can be based on processing of signaling information that conforms to a session internet protocol (SIP) or SS7, as in step 314. Accordingly the call can be a PSTN or VoIP call operating in an IMS communications architecture. SIP or SS7 signaling information can be utilized to identify the ID of the communication device 116 being targeted and the voicemail redirection request. In one embodiment, the call can be processed by the network proxy 122 as a sequence of dual tone multi-frequency (DTMF) signals corresponding to the ID of the communication device 116 and the voicemail redirection request, as in step 316.

The voicemail redirection request can comprise a code entered at the caller's communication device, as in step 318. For example, an asterisk/numerical code can be used by a caller to indicate a voicemail redirection request. The caller can for instance dial "222-333-4444" to identify the called party immediately followed by dialing "*2" to signal a voicemail redirection request. A redirection number to access the voicemail system 122 can be determined by the network proxy 122 from the ID of the communication device 116, as in step 320. For example, the number 222-333-4444 can be used as an index to a database of the network proxy 122 to determine a contact number for the voicemail system 123 (e.g., 222-333-4545). With this technique, the call can be redirected by the network proxy 122 to the voicemail system 123 using the redirection number.

The voicemail redirection request can also comprise a voicemail account ID, as in step 322. The voicemail account ID can be used by the network proxy 122 for selecting the corresponding voicemail account in the voicemail system 123. For example, the caller can dial "222-333-4444" to identify the called party immediately followed by dialing "*2" to signal a voicemail redirection request for voicemail account number 2. Alternatively, the network proxy 122 can transmit the voicemail account ID to the voicemail system 123 which selects the voicemail account for the calling party. The voicemail account ID can be utilized for providing the caller with access to a select voicemail account of the called party. The voicemail account IDs can be stored in database 126 for processing by controller 128 of the network proxy 122.

The voicemail system 122 can include an interactive voice response (IVR) system, as in step 324. The IVR system can utilize common voice recognition techniques that support a call flow for processing messages according to feedback supplied by the calling party (e.g., DTMF tones, voice responses, or other forms of electronic response entry).

From the foregoing descriptions, it would be evident to an artisan with ordinary skill in the art that the aforementioned embodiments can be modified, reduced, or enhanced without departing from the scope and spirit of the claims described below. For example, the voicemail system 122 and the network proxy 123 can be an integrated system as opposed to independently operated systems. Additionally, the voicemail system 122 can transmit a voicemail notice to the communication device 116 of the called party immediately after the caller has recorded a message. Said voicemail notice can indicate to the called party whether voicemail message is the result of a redirection request or a missed call. These are but a few examples of the modifications that can be applied to the present disclosure without departing from the scope of the claims. Accordingly, the reader is directed to the claims for a fuller understanding of the breadth and scope of the present disclosure.

Figure 4:
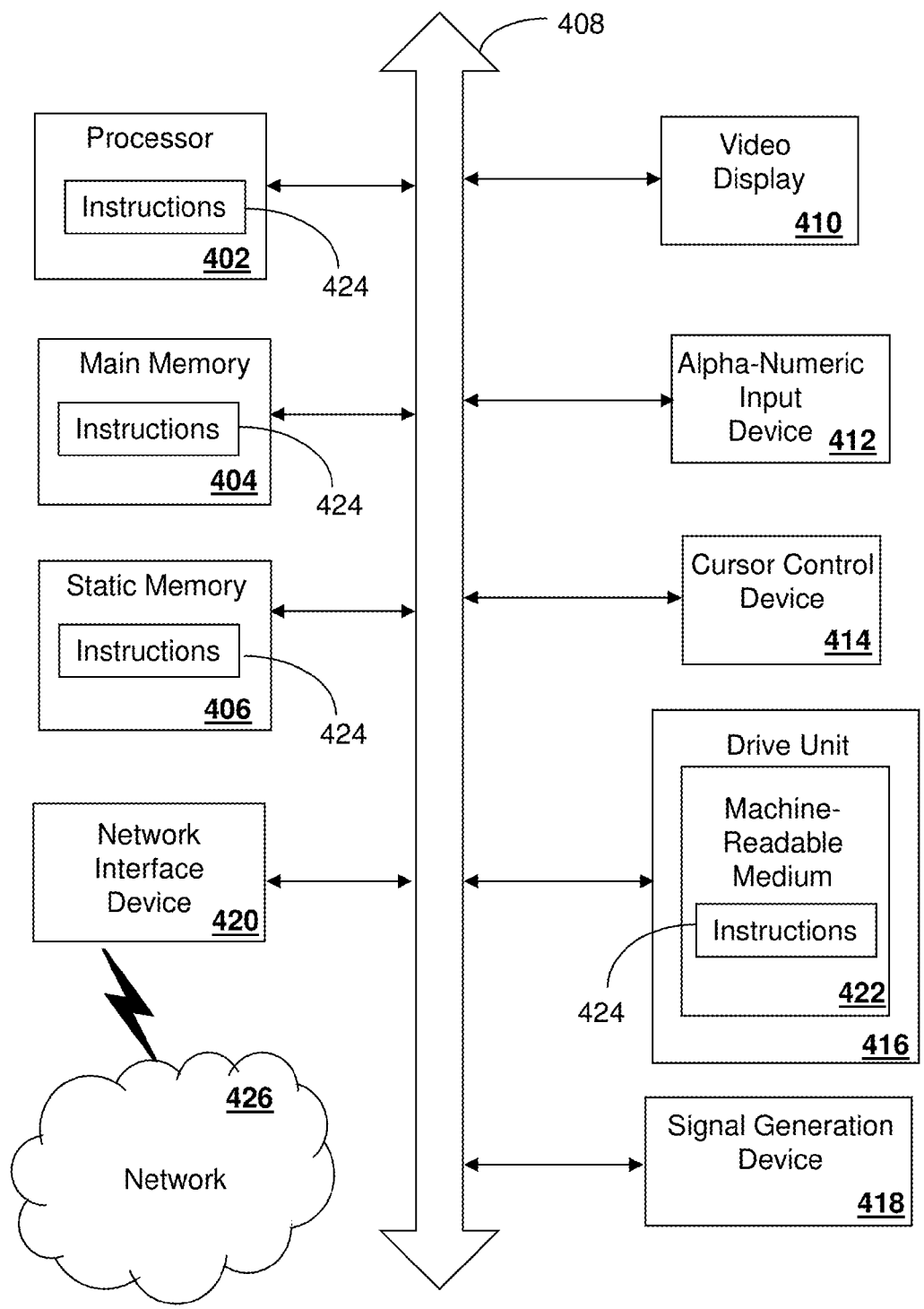
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising instructions which when executed by a processor, cause the processor to perform operations comprising:
  detecting a call directed to a first communication device according to signal information comprising an identifier of the first communication device and a voicemail redirection request, wherein the call is initiated by a second communication device, and wherein the voicemail redirection request comprises a code entered at the second communication device along with the identifier;
  determining whether a voicemail account is available for the first communication device according to the redirection request;
  determining a redirection number to access a voicemail system according to the identifier of the first communication device;
  redirecting the call to a voicemail system according to the redirection number responsive to determining that the voicemail account is available, wherein the call is redirected to the voicemail system without transmitting a notice of the call to the first communication device, wherein the voicemail redirection request comprises a voicemail account identifier for selectively identifying one among a plurality of voicemail accounts in the voicemail system;

transmitting a voicemail notice to the first communication device responsive to recording a voicemail message wherein the voicemail notice indicates whether the voicemail message is a result of a redirection request or a missed call;

presenting an interactive voicemail service at the first communication device; and preventing redirection of the call to the voicemail system and transmitting an error message from a network proxy to the second communication device responsive to determining that the voicemail account is not available and when the voicemail redirection request is detected, wherein the error message includes an option for re-dialing the first communication device, wherein the signal information conforms to a session initiation protocol, and wherein the identifier of the first communication device comprises one of a session initiation protocol uniform resource identifier, a telephone uniform resource identifier, or an E.164 number.

2. The non-transitory computer-readable storage medium of claim 1, wherein the error message comprises an auto-connection feature.

3. The non-transitory computer-readable storage medium of claim 2, wherein the error message further comprises one of a text message or an audio message.

4. The non-transitory computer-readable storage medium of claim 1, wherein the processor further performs operations comprising detecting a sequence of dual tone multi-frequency signals corresponding to the identifier of the first communication device and the voicemail redirection request.

5. The non-transitory computer-readable storage medium of claim 1, wherein the redirecting comprises redirecting the call to the voicemail account and recording in the voicemail account a voicemail message supplied by the second communication device responsive to determining that the voicemail account is available.

6. The non-transitory computer-readable storage medium of claim 1, wherein the voicemail redirection request comprises a voicemail account identifier for selectively identifying one among a plurality of voicemail accounts in the voicemail system.

7. The non-transitory computer-readable storage medium of claim 1, wherein the interactive voicemail service comprises an interactive voice response system.

8. The non-transitory computer-readable storage medium of claim 1, wherein the error message is transmitted according to a type of the second communication device.

9. A voicemail system, comprising:
a memory comprising instructions; and
a controller element coupled to the memory, wherein the controller when executing the instructions performs operations comprising:
receiving a call redirected away from a targeted communication device without providing notice to the targeted communication device of the call responsive to a voicemail redirection request supplied by signal information associated with the call, wherein the call is initiated by a caller's communication device, wherein the voicemail redirection request comprises a code entered at the caller's communication device in addition to an identifier of the targeted communication device, and wherein the call is redirected to the controller element responsive to a detection of the code;

determining whether a voicemail account is available for the communication device wherein the voicemail redirection request comprises a voicemail account identifier for selectively identifying one among a plurality of voicemail accounts in the voicemail system;

determining a redirection number to access the voicemail system according to the identifier of the targeted communication device;

redirecting the call to the voicemail system according to the redirection number responsive to determining that the voicemail system is available;

transmitting a voicemail notice to the targeted communication device responsive to recording a voicemail message wherein the voicemail notice indicates whether the voicemail message is a result of a redirection request or a missed call;

presenting an interactive voicemail service at the target communication device; and preventing redirection of the call to the voicemail account and transmitting an error message to the caller's communication device responsive to determining that the voicemail account is not available and when the voicemail redirection request is detected, wherein the error message includes an option for re-dialing the communication device, wherein the signal information conforms to a session initiation protocol, and wherein the identifier of the targeted communication device comprises one of a session initiation protocol uniform resource identifier, a telephone uniform resource identifier, or an E.164 number.

10. The voicemail system of claim 9, wherein the error message comprises an auto-connection feature.

11. The voicemail system of claim 10, wherein the error message further comprises one of a text message or an audio message.

12. The voicemail system of claim 9, wherein the controller element further performs operations comprising detecting a sequence of dual tone multi-frequency signals corresponding to the identifier of the targeted communication device and the voicemail redirection request.

13. The voicemail system of claim 9, wherein the redirecting comprises redirecting the call to the voicemail account and recording in the voicemail account a voicemail message supplied by the caller's communication device responsive to determining that the voicemail account is available.

14. The voicemail system of claim 9, wherein the voicemail redirection request comprises a voicemail account identifier for selectively identifying one among a plurality of voicemail accounts in the voicemail system.

15. The voicemail system of claim 9, wherein the interactive voicemail service comprises a voice response system.

16. The voicemail system of claim 9, wherein the error message is transmitted according to a type of the caller's communication device.

17. A communication device, comprising:
a memory comprising instructions; and
a controller element coupled to the memory, wherein the controller element when executing the instructions performs operations comprising:
initiating a call comprising signal information comprising an identifier of a targeted communication device and a voicemail redirection request that requests redirection of the call to a voicemail system without a notice supplied to the targeted communication device wherein the voicemail redirection request comprises a voicemail account identifier for selectively identifying one among a plurality of voicemail accounts in the voicemail system and wherein a voicemail notice to the targeted communication device is transmitted responsive to recording a voicemail message wherein the voicemail notice indicates whether the voicemail message is a result of a redirection request or a missed call and wherein the voicemail account identifier comprises a redirection number;

presenting an interactive voicemail service at a display of the communication device; and receiving an error message preventing redirection of the call to the voicemail system in response to the voicemail system failing to detect an availability of a voicemail account associated with the identifier of the targeted communication device when the redirection request is detected by entering a code, wherein the error message includes an option for re-dialing the communication device, wherein the signaling information conforms to a session initiation protocol and wherein the identifier of the targeted communication device comprises one of a session initiation protocol uniform resource identifier, a telephone uniform resource identifier, or an E.164 number.

18. The communication device of claim 17, wherein the call corresponds to a voice over internet protocol call.

19. The communication device of claim 17, wherein the call is processed by a network element of an internet protocol multimedia subsystem communication system.

20. The communication device of claim 17, wherein the voicemail redirection request comprises a voicemail account identifier for selectively identifying one of a plurality of voicemail accounts in the voicemail system.

* * * * *